(12) United States Patent
Sasaki

(10) Patent No.: US 11,076,067 B2
(45) Date of Patent: Jul. 27, 2021

(54) INFORMATION PROCESSING APPARATUS METHOD OF CONTROLLING INFORMATION PROCESSING APPARATUS AND STORAGE MEDIUM

(71) Applicant: CANON KABUSHIKI KAISHA, Tokyo (JP)

(72) Inventor: Hidemi Sasaki, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/773,729

(22) Filed: Jan. 27, 2020

(65) Prior Publication Data
US 2020/0252515 A1 Aug. 6, 2020

(30) Foreign Application Priority Data
Jan. 31, 2019 (JP) .............................. JP2019-016308

(51) Int. Cl.
*H04N 1/00* (2006.01)
*G09G 5/10* (2006.01)

(52) U.S. Cl.
CPC .......... *H04N 1/00891* (2013.01); *G09G 5/10* (2013.01); *H04N 1/00904* (2013.01); *G09G 2330/021* (2013.01); *G09G 2330/027* (2013.01)

(58) Field of Classification Search
CPC .. H04N 1/00891; H04N 1/00904; G09G 5/10; G09G 2330/027; G09G 2330/021; G09G 2370/22; G09G 5/363
See application file for complete search history.

(56) References Cited

U.S. PATENT DOCUMENTS

2017/0316734 A1* 11/2017 Asai ..................... G09G 3/3611
2018/0069979 A1* 3/2018 Ito ..................... H04N 1/00891

FOREIGN PATENT DOCUMENTS

WO 2016/093144 A1 6/2016

* cited by examiner

*Primary Examiner* — Neil R McLean
(74) *Attorney, Agent, or Firm* — Canon U.S.A., Inc. IP Division

(57) ABSTRACT

An information processing apparatus includes a transmission unit configured to transmit display image data and a display unit configured to display an image based on the display image data. The information processing apparatus further includes a switching unit configured to switch between inputting and not inputting the display image data transmitted by the transmission unit to the display unit, a control unit configured to control the switching unit to switch between inputting and not inputting the display image data to the display unit, and a power control unit configured to supply power to the display unit after the transmission unit starts transmitting the display image data. After the power control unit starts supplying power, the control unit controls the switching unit so that the display image data is input to the display unit.

16 Claims, 11 Drawing Sheets

FIG.11

| TRANSMISSION SOURCE | TRANSMISSION DESTINATION | DATA | DEFINITION |
|---|---|---|---|
| CONTROLLER | OPERATION UNIT | 0x0001 | INITIALIZATION COMMAND |
| OPERATION UNIT | CONTROLLER | 0xFF01 | INITIALIZATION COMMAND RESPONSE |
| CONTROLLER | OPERATION UNIT | 0x0002 | SCREEN DISPLAY COMMAND |
| OPERATION UNIT | CONTROLLER | 0xFF02 | SCREEN DISPLAY COMMAND RESPONSE |
| CONTROLLER | OPERATION UNIT | 0x0003 | SCREEN POWER-SAVING COMMAND |
| OPERATION UNIT | CONTROLLER | 0xFF03 | SCREEN POWER-SAVING COMMAND RESPONSE |
| CONTROLLER | OPERATION UNIT | 0x00FF | END COMMAND |
| OPERATION UNIT | CONTROLLER | 0xFFFF | END COMMAND RESPONSE |
| CONTROLLER | OPERATION UNIT | 0x00AX | LED TURN-ON COMMAND (XX = POSITION) |
| OPERATION UNIT | CONTROLLER | 0xFFAX | LED TURN-ON COMMAND RESPONSE |
| CONTROLLER | OPERATION UNIT | 0x00BX | LED TURN-OFF COMMAND (XX = POSITION) |
| OPERATION UNIT | CONTROLLER | 0xFFBX | LED TURN-OFF COMMAND RESPONSE |
| CONTROLLER | OPERATION UNIT | 0x00C0 | BUZZER SOUND COMMAND |
| OPERATION UNIT | CONTROLLER | 0xFFC0 | BUZZER SOUND COMMAND RESPONSE |
| OPERATION UNIT | CONTROLLER | 0x02XX | PHYSICAL KEY PRESS COMMAND (XX = POSITION) |
| CONTROLLER | OPERATION UNIT | 0xFDXX | PHYSICAL KEY PRESS COMMAND RESPONSE |
| OPERATION UNIT | CONTROLLER | 0x0103 | DISPLAYABLE STATE NOTIFICATION COMMAND |
| CONTROLLER | OPERATION UNIT | 0xFE03 | DISPLAYABLE STATE NOTIFICATION COMMAND RESPONSE |
| CONTROLLER | OPERATION UNIT | 0xAAAA | COMMAND ERROR RESPONSE |

INFORMATION PROCESSING APPARATUS METHOD OF CONTROLLING INFORMATION PROCESSING APPARATUS AND STORAGE MEDIUM

BACKGROUND

Field

The present disclosure relates to an information processing apparatus a method of controlling the information processing apparatus and a storage medium.

Description of the Related Art

In an information processing apparatus, a central processing unit (CPU) of a main controller generates display image data and transmits the generated display image data to a display unit. The display unit receives the display image data transmitted from the CPU and displays an image based on the received display image data.

PCT International Publication No. WO 16/093144 discusses an information processing apparatus that includes a host that transmits display image data and a display control apparatus that displays an image on a liquid crystal display (LCD) based on the display image data received from the host.

The host of the information processing apparatus outputs an instruction to update display image data that is to be input to the LCD to the display control apparatus and transmits the display image data that is to be input to the LCD to the display control apparatus thereafter. The display control apparatus analyzes the received command and controls a data processing unit 40 based on the received command to determine whether to input the display image data received by an image reception unit 20 to the LCD or store the display image data on a video random access memory (VRAM) 50.

In a case of turning on a power source of the display unit and displaying an image on the display unit, the CPU of the information processing apparatus transmits a display image data input control command to the display unit and transmits display image data after turning on the power source of the display unit. Meanwhile, after the information processing apparatus turns on the display unit, the display unit receives the display image data input control command and displays an image based on the received display image data based on the received command.

SUMMARY

With respect to the above-discussed related art, it has now been determined that in a case where the CPU executes processing corresponding to an interruption request received while generating display image data, the time needed to generate display image data and transmit the generated display image data is longer than that in a case where the CPU simply generates display image data and transmits the generated display image. If the CPU is configured to generate display image data and transmit the generated display image data after the supply of power to the display unit is started, the time during which the display image data is not input although power is supplied to the display unit can become longer than an expected length of time. On the other hand, if the CPU is configured to generate display image data and transmit the generated display image data before the supply of power to the display unit is started, the display image data is input to the LCD although no power is supplied to the display unit.

In consideration of the above, in accordance with an aspect of the present disclosure, an information processing apparatus includes a transmission unit configured to transmit display image data, and a display unit configured to display an image based on the display image data transmitted by the transmission unit. The information processing apparatus further includes a switching unit configured to switch between inputting and not inputting the display image data transmitted from the transmission unit to the display unit, a control unit configured to control the switching unit to switch between inputting and not inputting the display image data to the display unit, and a power control unit configured to supply power to the display unit after the transmission unit starts transmitting the display image data. After the power control unit starts supplying power, the control unit controls the switching unit such that the display image data is input to the display unit.

Further features of the present disclosure will become apparent from the following description of exemplary embodiments with reference to the attached drawings.

BRIEF DESCRIPTION OF THE DRAWINGS

FIG. 11 illustrates an example of control commands that are exchanged between the controller board and the operation unit board according to the exemplary embodiment of the present disclosure.

DESCRIPTION OF THE EMBODIMENTS

A form of implementation of an information processing apparatus according to a first exemplary embodiment will be described below with reference to the drawings.

Figure 1:
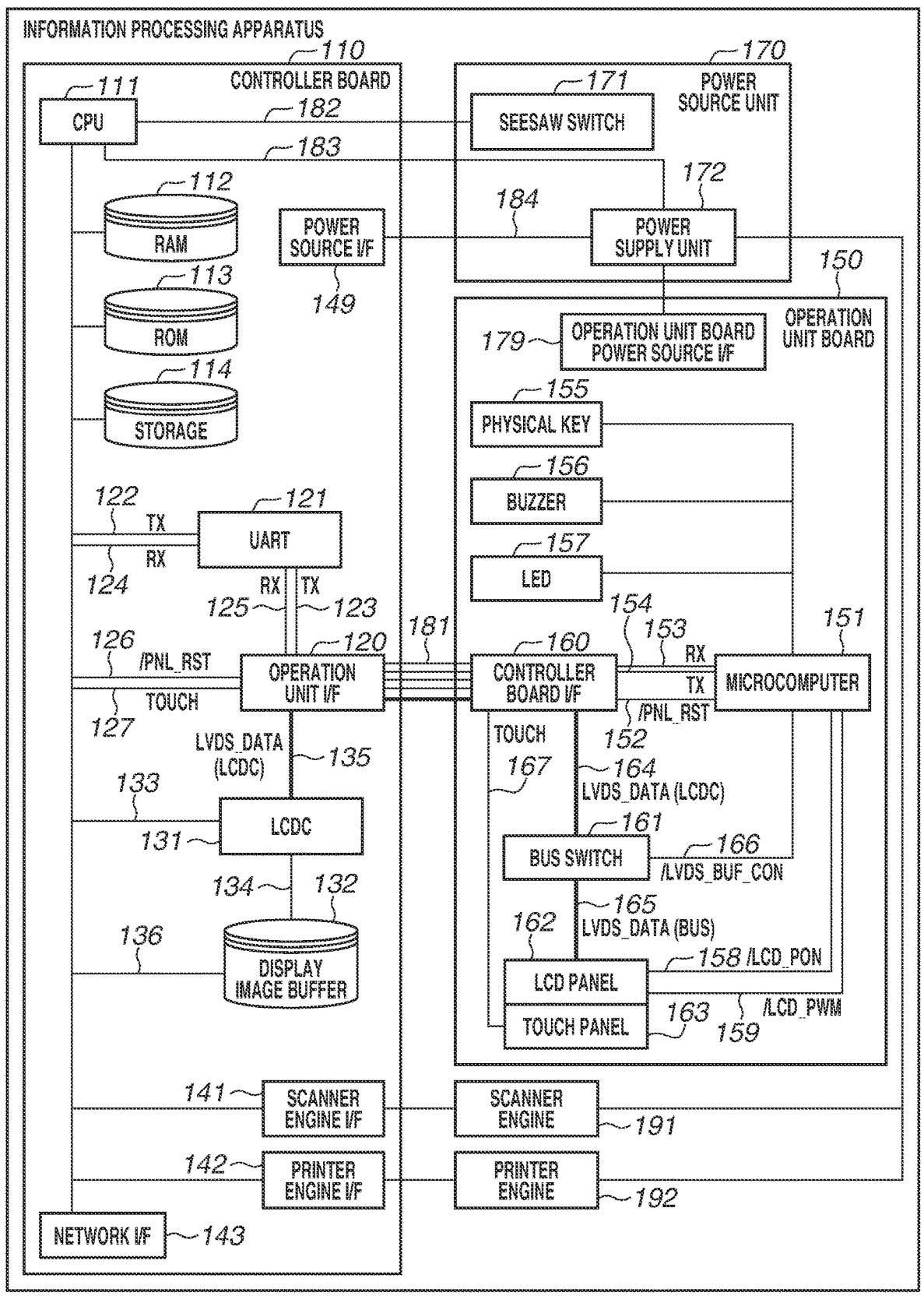
FIG. 1 illustrates an example of a configuration of an information processing apparatus according to an exemplary embodiment of the present disclosure.

FIG. 1 illustrates a configuration of the information processing apparatus according to the present exemplary embodiment. An information processing apparatus 100 according to the present exemplary embodiment includes a controller board 110, an operation unit board 150, a scanner engine 191, a printer engine 192, and a power source unit 170.

The controller board 110 is a control board configured to control the information processing apparatus 100.

The operation unit board 150 is a control board configured to receive a user operation on the information processing apparatus 100 and control an operation unit that informs a user of information about the information processing apparatus 100.

The printer engine 192 is an image forming unit configured to form an image on a sheet based on print image data formed by the controller board 110 based on a request from the controller board 110.

The scanner engine 191 is a unit configured to output read image data acquired by reading an image on a set document to the controller board 110 based on a request from the controller board 110.

The power source unit 170 is a unit configured to supply power to the controller board 110, the operation unit board 150, the scanner engine 191, and the printer engine 192.

The controller board 110 and the operation unit board 150 are connected via a communication bundle line 181 and can transmit and receive information to and from each other. In the present exemplary embodiment, the communication bundle line 181 includes five types of signal lines described below.

The first signal line is a signal line via which the controller board 110 transmits a control command and a response to a command from the operation unit board 150 and the operation unit board 150 receives the control command.

The second signal line is a signal line via which the operation unit board 150 transmits a control command and a response to a command from the controller board 110 and the controller board 110 receives the response to the control command.

The third signal line is a display image data signal line for transferring display image data that is to be displayed on a liquid crystal display (LCD) panel 162 of the operation unit board 150.

The fourth signal line is a reset signal line via which a central processing unit (CPU) 111 of the controller board 110 transfers a reset signal for resetting hardware in the operation unit board 150.

The fifth signal line is a touch sensor signal line via which an output of a touch panel 163 in the operation unit board 150 is transferred to the control board.

In the present exemplary embodiment, the signal lines on the controller board 110 and the signal lines on the operation unit board 150 are electrically connected, and the same signal flows at substantially the same time on the signal lines.

The power source unit 170 and the controller board 110 are connected via a seesaw switch signal line 182, a power control line 183, and a power line 184. The seesaw switch signal line 182 is a signal line via which a notification of an event of a press of a seesaw switch 171 is transmitted from the power source unit 170 to the controller board 110. The power control line 183 is a signal line via which the controller board 110 controls the supply of power to the operation unit board 150, the scanner engine 191, and the printer engine 192. The power line 184 is a signal line via which power is supplied from the power source unit 170 to the controller board 110.

The controller board 110 and the scanner engine 191 are provided with a signal line to transmit and receive information to and from each other, and the controller board 110 and the printer engine 192 are also provided with a signal line to transmit and receive information to and from each other.

Details of the controller board 110 will be described below. The controller board 110 includes the CPU 111, a random access memory (RAM) 112, a read-only memory (ROM) 113, and a storage 114. Further, the controller board 110 includes an operation unit interface (I/F) 120, a universal asynchronous receiver/transmitter (UART) 121, a LCD controller (LCDC) 131, and a display image buffer 132. Further, the controller board 110 includes a scanner engine I/F 141, a printer engine I/F 142, a network I/F 143, and a power source I/F 149.

The CPU 111 is a central processing apparatus configured to realize a function of the information processing apparatus 100. For example, the CPU 111 generates display image data that is to be displayed on the LCD panel 162 on the operation unit board 150 and stores the generated display image data on the RAM 112.

The ROM 113 is a non-volatile storage area configured to hold an initialization program for execution of initialization processing by the CPU 111 when a user turns on the information processing apparatus 100.

The storage 114 is a non-volatile storage area configured to hold a main program for realization of a function as the information processing apparatus 100 by the CPU 111. Further, the storage 114 also serves as a non-volatile storage area for holding a result of processing performed by the CPU 111. Specifically, a hard disk drive or a solid state drive is implemented as the storage 114. Further, the controller board 110 can include a plurality of storages 114.

The operation unit I/F 120 is an interface for communication with the operation unit board 150. The operation unit I/F 120 is connected to a controller board I/F 160 of the operation unit board 150 via the communication bundle line 181.

The UART 121 is a communication chip for communication between the CPU 111 and a microcomputer 151. The UART 121 converts a parallel signal in the controller board 110 into a serial signal that can be handled in the operation unit board 150. The UART 121 also converts a serial signal transferred from the operation unit board 150 into a parallel signal that can be handled in the controller board 110. Further, the UART 121 adds a data bit length, a parity bit, and/or a stop bit according to communication protocols for communication with the operation unit board 150. The UART 121 generates a signal according to the communication protocols, thereby detecting a data loss and replenishing the lost data during communication between the controller board 110 and the operation unit board 150.

FIG. 11 illustrates an example of control commands that are transmitted and received via the UART 121. For example, an initialization command for initialization of the operation unit board 150, a display image request command, and a power-saving command are transmitted between the controller board 110 and the operation unit board 150.

The initialization command is a command by which the controller board 110 requests the operation unit board 150 to perform initialization processing immediately after power is supplied to the operation unit board 150.

A screen display command is a command by which the controller board 110 requests the operation unit board 150 to display an image on the LCD panel 162 based on display image data.

A screen power-saving command is a command by which the controller board 110 requests the operation unit board 150 to stop displaying the image on the LCD panel 162 based on the display image data.

An end command is a command by which the controller board 110 requests the operation unit board 150 to perform end processing immediately before the supply of power to the operation unit board 150 is stopped.

A light emitting diode (LED) turn-on command is a command for requesting to turn on a LED 157. In a case where the LED 157 includes a plurality of LEDs, information that specifies the position of each LED can be embedded in a portion of the LED turn-on command in order to control each LED separately.

A LED turn-off command is a command for requesting to turn off the LED 157. In a case where the LED 157 includes a plurality of LEDs, information that specifies the position (identifier) of each LED can be embedded in a portion of the LED turn-off command in order to control each LED separately.

A buzzer sound command is a command by which the controller board 110 requests the operation unit board 150 to sound a buzzer 156. A physical key press command is a command by which the operation unit board 150 notifies the controller board 110 that a physical key 155 is pressed. In a case where the physical key 155 includes a plurality of physical keys, information that indicates an identifier of each physical key can be embedded in a portion of the physical key press command. A command error response is a command response issued in a case where the controller board 110 receives a control command that is not expected in the current state.

A displayable state notification command is a command by which the operation unit board 150 notifies the controller board 110 that the LCD panel 162 successfully starts displaying display image data.

In the present exemplary embodiment, if the controller board 110 or the operation unit board 150 transmits one command, the receiver then transmits a response to the command. In a case where the board that outputs a command does not have to recognize the output result of the command, a response to the command can be omitted.

The LCDC 131 is a module configured to transfer display image data formed on the RAM 112 by the CPU 111 to the operation unit board 150. The LCDC 131 receives display image data stored on the RAM 112 via a LCDC control line 133. The LCDC 131 temporarily stores the received display image data on the display image buffer 132 via a display image data signal line 134. The LCDC 131 reads the display image data stored on the display image buffer 132 via the display image data signal line 134 at predetermined time intervals. The LCDC 131 then transfers the read display image data to the operation unit board 150 via a display image data signal line LVDS_DATA(LCDC) 135 and the operation unit I/F 120.

The display image buffer 132 is a volatile storage area for temporarily storing the display image data that is to be transmitted to the operation unit board 150 by the LCDC 131. The CPU 111 controls a power source of the display image buffer 132 via a display image buffer control line 136. In the present exemplary embodiment, the controller board 110 includes the display image buffer 132 as a separate volatile storage area from the RAM 112. For example, a portion of the RAM 112 can be allocated to the display image buffer 132.

The scanner engine I/F 141 is an interface via which a control request is issued to the scanner engine 191 and information from the scanner engine 191 is acquired.

The printer engine I/F 142 is an interface via which a control request is issued to the printer engine 192 and information from the printer engine 192 is acquired.

The network I/F 143 is an interface via which the information processing apparatus 100 receives an instruction from an external device and provides information to the external device. For example, the information processing apparatus 100 can receive print data from an external host personal computer (PC) and transmit a notification of the state of the information processing apparatus 100 in a web page format in response to a request from the host PC, via the network I/F 143.

The power source I/F 149 is an interface via which necessary power for operating the controller board 110 is received from the power source unit 170 via the power line 184.

Next, details of the operation unit board 150 will be described below. The operation unit board 150 includes the microcomputer 151, the physical key 155, the buzzer 156, and the LED 157. The operation unit board 150 further includes the controller board I/F 160, a bus switch 161, the LCD panel 162, the touch panel 163, and an operation unit board power source I/F 179.

The microcomputer 151 is a central processing apparatus configured to realize a function of the operation unit board 150. In the present exemplary embodiment, the microcomputer 151 includes a non-volatile storage area configured to store a program for controlling the operation unit board 150 and temporary information.

The microcomputer 151 includes a plurality of signal lines to control each component on the operation unit board 150. The microcomputer 151 is connected to a reset signal line (/PNL_RST) 152 for receiving a reset request, and a UART reception line (RX) 153 and a UART transmission line (TX) 154 for performing communication with the controller board 110. The microcomputer 151 is also connected to a signal line for detecting a press of the physical key 155 and a signal line for controlling the buzzer 156 and the LED 157. The microcomputer 151 is also connected to a LCD panel power source signal line (/LCD_PON) 158 for controlling a power source of the LCD panel 162. Further, the microcomputer 151 is connected to a backlight control signal line (LCD_PWM) 159 for controlling a backlight of the LCD panel 162. The microcomputer 151 is connected to a bus switch control signal line (/LVDS_BUF_CON) 166 for controlling the bus switch 161.

The physical key 155 is a key that the user can press, and the user uses the physical key 155 to operate the information processing apparatus 100. The operation unit board 150 transmits the type and state of a pressed key as a control command to the controller board 110 via the UART transmission line (TX) 154. The CPU 111 of the controller board 110 analyzes the control command received from the operation unit board 150 and recognizes a user operation based on the analysis.

The buzzer 156 is a device configured to notify the user of an error in the information processing apparatus 100. The microcomputer 151 turns on/off the buzzer 156 based on a control command received from the controller board 110.

The LED 157 is turned on, turned off, or caused to blink to notify the user of the state of the information processing apparatus 100. The microcomputer 151 turns on/off the LED 157 or causes the LED 157 to blink based on a control command received from the controller board 110.

The controller board I/F 160 is an interface via which the operation unit board 150 communicates with the controller board 110.

The bus switch 161 is a switch for controlling whether to transmit display image data received via a display image data signal line (LVDS_DATA(LCDC)) 164 to the LCD panel 162. The microcomputer 151 controls the bus switch 161. The bus switch 161 is switched according to the control to output display image data received from the controller board 110 to the LCD panel 162 or not to output the received display image data to the LCD panel 162.

The LCD panel 162 is a liquid crystal panel configured to function as a display unit that displays display screen data generated by the CPU 111 of the controller board 110. The microcomputer 151 controls the supply of power to the LCD panel 162. Further, the microcomputer 151 controls the backlight of the LCD panel 162.

The touch panel 163 is a device configured to detect a touch operation performed on the information processing apparatus 100 by the user. The touch panel 163 detects information about the position and intensity of the press and notifies the controller board 110 of the detected information. The CPU 111 of the controller board 110 determines the touch operation performed by the user based on the information provided by the operation unit board 150.

The operation unit board power source I/F 179 is an interface via which necessary power for operating the operation unit board 150 is received from the power source unit 170.

Lastly, details of the power source unit 170 will be described below. The power source unit 170 includes the seesaw switch 171 and a power supply unit 172. The seesaw switch 171 is an input unit via which the user inputs an instruction to turn on or off the information processing apparatus 100. The power supply unit 172 is a unit configured to supply power to the controller board 110, the operation unit board 150, the scanner engine 191, and the printer engine 192 based on power supplied from an electric outlet. The controller board 110 receives power supplied via the power source I/F 149. The operation unit board 150 receives power supplied via the operation unit board power source I/F 179.

Figure 2:
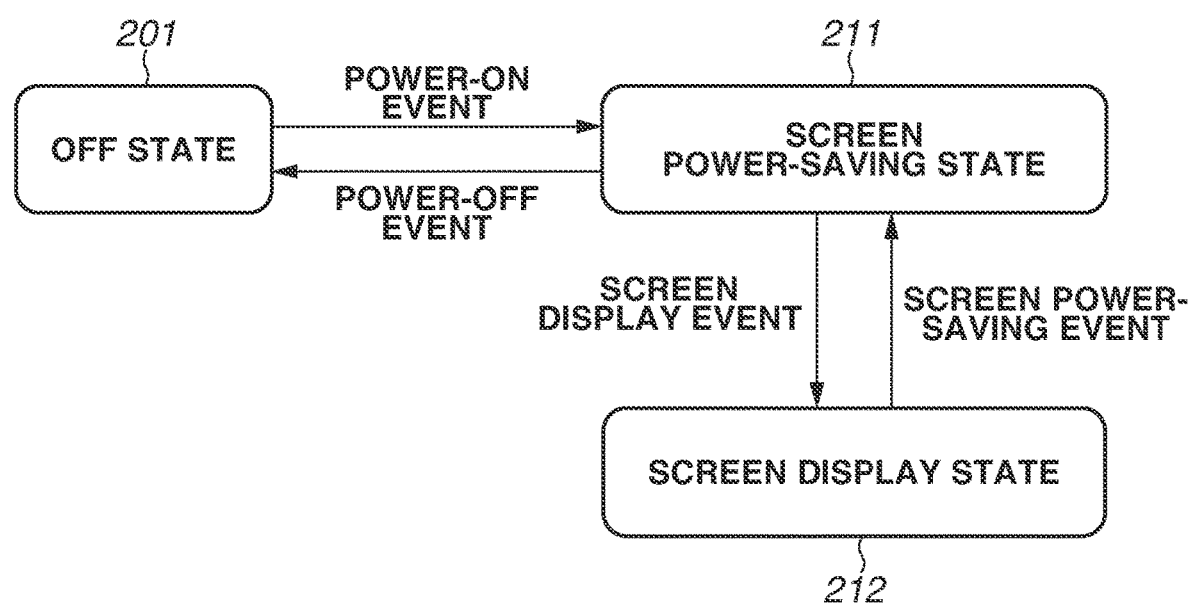
FIG. 2 illustrates an example of a state change of the information processing apparatus according to the exemplary embodiment of the present disclosure.

FIG. 2 illustrates changes in states of the information processing apparatus 100 and the operation unit board 150.

In the present exemplary embodiment, the operation unit board 150 is in one of three states: an off state 201, a screen power-saving state 211, and a screen display state 212. The state that the operation unit board 150 is in is stored on the RAM 112 of the controller board 110 and a memory (not illustrated) attached to the microcomputer 151.

The off state 201 is a state where no power is supplied to the operation unit board 150 and the controller board 110. For example, the off state 201 is a state where a power plug of the information processing apparatus 100 is not connected to an electric outlet or a state where the power plug of the information processing apparatus 100 is connected to an electric outlet but the seesaw switch 171 is off.

The screen power-saving state 211 is a state where power is supplied to the operation unit board 150, the microcomputer 151 operates, and no power is supplied to the LCD panel 162.

The screen display state 212 is a state where power is supplied to the operation unit board 150, the microcomputer 151 operates, power is supplied to the LCD panel 162, and display image data is displayed.

When the operation unit board 150 is in the off state 201 and a power-on event occurs in the information processing apparatus 100, the operation unit board 150 is changed to the screen power-saving state 211. The power-on event is a command that is issued if the user operates the seesaw switch 171 and turns on the information processing apparatus 100.

When the operation unit board 150 is in the screen power-saving state 211 and a screen display event occurs in the information processing apparatus 100, the operation unit board 150 is changed to the screen display state 212. The screen display event is, for example, a display instruction that is issued upon completion of initialization of the LCDC 131. Further, the screen display event is also issued in a case where the user operates the physical key 155 or the touch panel 163 when the information processing apparatus 100 is in the screen power-saving state 211.

When the operation unit board 150 is in the screen display state 212 and a screen power-saving event occurs in the information processing apparatus 100, the operation unit board 150 is changed to the screen power-saving state 211. The screen power-saving event is an instruction not to perform screen display which is issued when the user operates a key to input an instruction to change to the screen power-saving state 211 or when a predetermined period of time passes from the last operation of the information processing apparatus 100. When the operation unit board 150 is in the screen power-saving state 211 and a power-off event occurs in the information processing apparatus 100, the operation unit board 150 is changed to the off state 201. The power-off event is an event that is issued when the user turns off the seesaw switch 171.

If the information processing apparatus 100 is turned on, the operation unit board 150 is changed from the off state 201 to the screen power-saving state 211. If display image data is formed and prepared, the controller board 110 transmits a screen display command. If the operation unit board 150 receives the screen display command, the operation unit board 150 is changed from the screen power-saving state 211 to the screen display state 212 and starts displaying an image based on the screen display data. Further, when the operation unit board 150 is in the screen display state 212 and the seesaw switch 171 is turned off, the information processing apparatus 100 issues a screen power-saving command, and the operation unit board 150 is changed to the screen power-saving state 211. Thereafter, the information processing apparatus 100 issues a power-off event, and the operation unit board 150 is changed to the off state 201.

Figure 3:
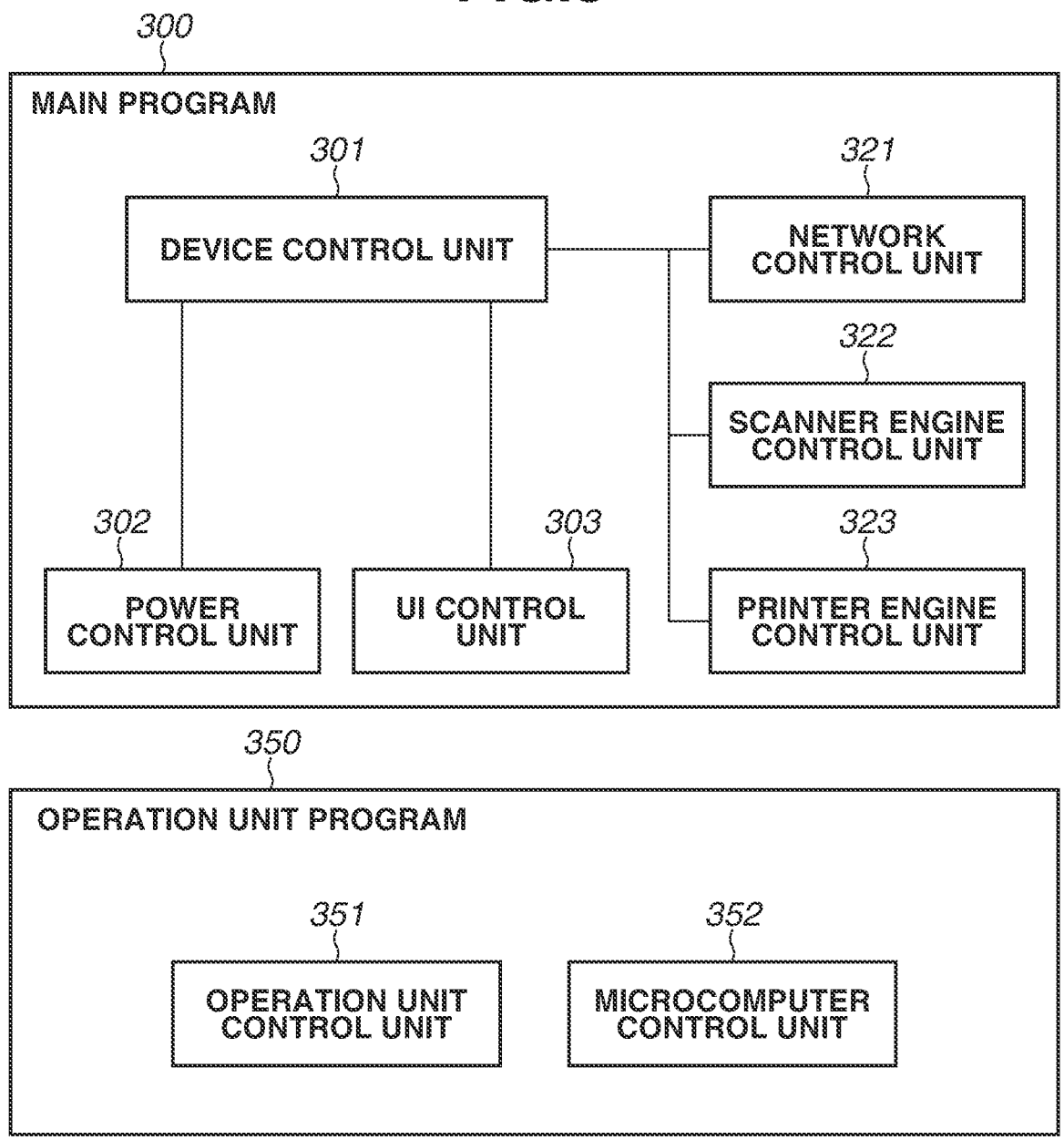
FIG. 3 illustrates an example of a software block of the information processing apparatus according to the exemplary embodiment of the present disclosure.

FIG. 3 is a software block diagram illustrating a main program 300, which is executed on the controller board 110, and an operation unit program 350, which is executed on the operation unit board 150.

The main program 300 includes a device control unit 301, a power control unit 302, and a user interface (UI) control unit 303. The main program 300 further includes a network control unit 321, a scanner engine control unit 322, and a printer engine control unit 323.

The device control unit 301 is a control unit configured to control the entire information processing apparatus 100. The device control unit 301 performs processing such as scheduling of processing that is to be executed by the information processing apparatus 100.

The power control unit 302 is a software module configured to control the power of the information processing apparatus 100.

The UI control unit 303 is a control unit configured to control transfer of data and command between the controller board 110 and the operation unit board 150. Details of the UI control unit 303 will be described below with reference to FIG. 4.

The network control unit 321 is a software module configured to receive communication between the information processing apparatus 100 and an external apparatus via the network I/F 143.

The scanner engine control unit 322 controls the scanner engine 191 via the scanner engine I/F 141.

The printer engine control unit 323 controls the printer engine 192 via the printer engine I/F 142.

The operation unit program 350 includes an operation unit control unit 351 and a microcomputer control unit 352. The operation unit control unit 351 controls the supply of power to the LCD panel 162, controls turning-on of the backlight of the LCD panel 162, and controls the bus switch 161. The microcomputer control unit 352 further performs hardware control such as processing of resetting the microcomputer 151.

The information processing apparatus 100 can include a page description language (PDL) data (print data) interpretation unit that interprets PDL data and a raster image processor (RIP) unit that forms print image data based on the result of PDL data interpretation.

A sequence of changing the operation unit board 150 from a state to another state among the states illustrated in FIG. 2 in the present exemplary embodiment will be described below with reference to FIGS. 4 to 7.

Figure 4:
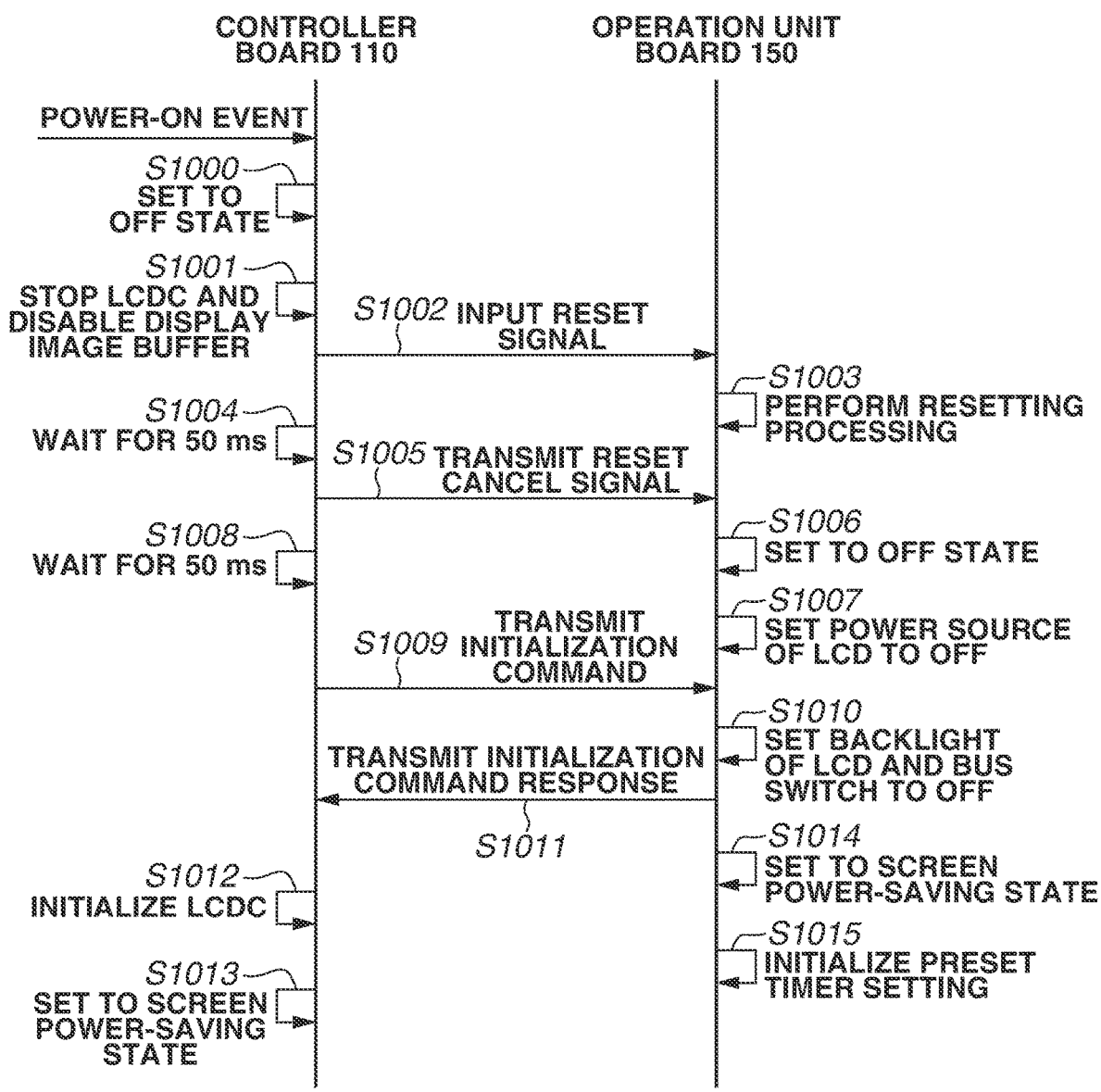
FIG. 4 is a sequence diagram illustrating a sequence of changing the information processing apparatus from an off state to a screen power-saving state.

FIG. 4 is a sequence diagram illustrating processing performed by the controller board 110 and the operation unit board 150 in changing the state of the operation unit board 150 from the off state 201 to the screen power-saving state 211 when the information processing apparatus 100 is turned on in the present exemplary embodiment. If the user turns on the seesaw switch 171, power is supplied from the power supply unit 172 of the power source unit 170 to the controller board 110 and the operation unit board 150, and then the process illustrated in the sequence diagram is started.

In step S1000, the UI control unit 303 of the controller board 110 sets the state of the operation unit board 150 that is stored on the RAM 112 to the off state 201.

In step S1001, the UI control unit 303 of the controller board 110 disables the LCDC 131 and the display image buffer 132. In step S1001, the UI control unit 303 disables the LCDC 131 by controlling a register relating to the LCDC 131 and a register relating to the display image buffer 132. Consequently, no display image data is transmitted from the controller board 110 to the operation unit board 150.

In step S1002, the UI control unit 303 of the controller board 110 inputs a reset signal to the microcomputer 151 of the operation unit board 150 based on the power-on event. In step S1003, the microcomputer control unit 352 of the operation unit board 150 resets the microcomputer 151 based on the received reset signal and performs control so that the microcomputer 151 does not output a signal.

In step S1004, the UI control unit 303 of the controller board 110 stops processing for 50 ms and waits until a start of next processing. Then, in step S1005, after 50 ms passes, the UI control unit 303 transmits a reset cancel signal to the operation unit board 150. Upon receipt of the reset cancel signal, the microcomputer control unit 352 of the operation unit board 150 activates the operation unit control unit 351. The process hereafter is executed by the operation unit control unit 351.

In step S1006, the operation unit control unit 351 of the operation unit board 150 sets the off state 201 as the state of the operation unit board 150 in a memory in the microcomputer 151. Then, in step S1007, the operation unit control unit 351 sets the power source of the LCD 162 to Off. In the present exemplary embodiment, the operation unit control unit 351 sets the signal line 158 for controlling the power of the LCD 162 to "H" (High) to set the power source of the LCD 162 to Off.

In step S1008, the UI control unit 303 of the controller board 110 stops processing for 50 ms from the transmission of the reset cancel signal and waits until a start of next processing. Thereafter, in step S1009, the UI control unit 303 of the controller board 110 transmits an initialization command to the operation unit board 150. In step S1010, if the initialization command is received, the operation unit control unit 351 of the operation unit board 150 sets the backlight of the LCD panel 162 and the bus switch 161 to Off. To set the backlight of the LCD panel 162 to Off, the operation unit control unit 351 sets the signal line 159 to 0%, which is a value corresponding to Off. Further, to set the bus switch 161 to Off, the operation unit control unit 351 sets the signal line 166 to "H" (High), which is a value corresponding to Off. The bus switch 161 is set to Off in step S1010, so that even if display image data is transmitted from the controller board 110 to the operation unit board 150, the display image data is controlled not to be input to the LCD panel 162 of the operation unit board 150.

In step S1011, the operation unit control unit 351 of the operation unit board 150 transmits an initialization command response to the controller board 110. In step S1014, the operation unit control unit 351 of the operation unit board 150 sets the state of the operation unit board 150 to the screen power-saving state. And in step S1015, the operation unit control unit 351 initializes a setting of a preset timer. In step S1012, the UI control unit 303 of the controller board 110 initializes the LCDC 131 upon receipt of the command. In the initialization of the LCDC 131, for example, an address of a location of data to be read on the RAM 112 and width, height, color depth, and format settings of display image data are set. At the time when the initialization processing of the LCDC 131 is executed, the LCDC 131 does not start transmitting display image data.

Then, in step S1013, the UI control unit 303 of the controller board 110 sets the state of the operation unit board 150 that is stored on the RAM 112 to the screen power-saving state 211.

By executing the above-described process, the processing of initializing the controller board 110 at the time of power-on and the processing of initializing the operation unit board 150 are completed. While the wait time in steps S1004 and S1008 in FIG. 4 is a period of 50 ms, the wait time can be any period of time as long as it is sufficient for the operation unit control unit 351 of the operation unit board 150 to execute processing for each signal and can be longer or shorter than the above-described time.

Figure 5:
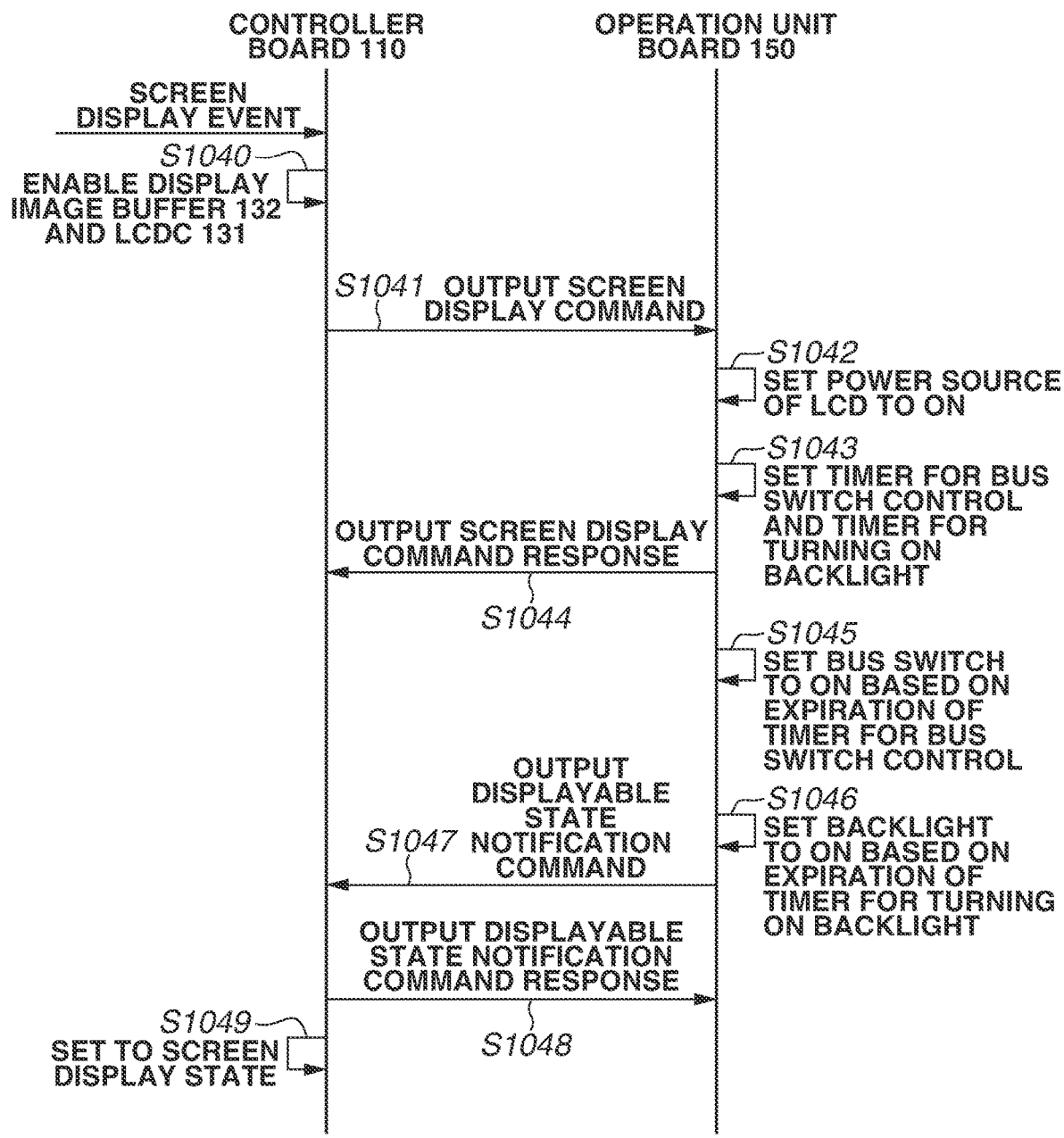
FIG. 5 is a sequence diagram illustrating a sequence of changing the information processing apparatus from the screen power-saving state to a screen display state.

Next, a process of changing from the screen power-saving state 211 to the screen display state 212 will be described below with reference to FIG. 5. FIG. 5 is a sequence diagram illustrating a process executed by the controller board 110 and the operation unit board 150 in changing from the screen power-saving state 211 to the screen display state 212. The processing of the sequence diagram is started based on an occurrence of a screen display event. The screen display event occurs based on, for example, completion of the processing of initializing the LCDC 131 in step S1007 in FIG. 4. Further, in a case where the information processing apparatus 100 is in the screen power-saving state 211, the screen display event occurs based on a user operation on the physical key 155.

In step S1040, the UI control unit 303 of the controller board 110 enables the display image buffer 132 and the LCDC 131. The UI control unit 303 controls the register relating to the display image buffer 132 and the register relating to the LCDC 131 to enable the display image buffer 132 and the LCDC 131. The display image buffer 132 is enabled in step S1040 so that display image data generated by the CPU 111 can be stored on the display image buffer 132. The CPU 111 starts generating display image data and stores the generated display image data on the display image buffer 132. Thereafter, the CPU 111 sets a setting to each register of the LCDC 131. Specifically, the CPU 111 sets the width and height of image data that is to be transmitted to the operation unit board 150 to the register of the LCDC 131. Then, the CPU 111 enables the LCDC 131 and starts transmitting the display image data stored on the display image buffer 132 to the operation unit board 150. In step S1040, although the controller board 110 starts transmitting the display image data, the display image data is not input to the LCD panel 162 due to the bus switch in the off state.

In step S1041, the UI control unit 303 of the controller board 110 outputs a screen display command to the operation unit board 150. In step S1042, the operation unit control unit 351 of the operation unit board 150 sets the power source of the LCD panel 162 to On based on the screen display command. The operation unit control unit 351 sets the signal line 158 for controlling the power source of the LCD panel 162 to "L" (Low), which is a value corresponding to On. Consequently, power is supplied from the power supply unit 172 to the LCD panel 162.

In step S1043, the operation unit control unit 351 of the operation unit board 150 sets a timer for controlling the bus switch 161 and a timer for controlling the backlight to turn on and starts time measurement. Then, in step S1044, the operation unit control unit 351 of the operation unit board 150 outputs a screen display command response in response to the screen display command from the controller board 110.

In step S1045, the operation unit control unit 351 of the operation unit board 150 sets the bus switch 161 to On based on expiration of the timer for controlling the bus switch 161. The operation unit control unit 351 sets the signal line 166 to "L" (Low), which is a value corresponding to On. Consequently, display image data transmitted from the controller board 110 is input to the LCD panel 162. As described above, the bus switch 161 is turned on after the controller board 110 starts transmitting the display image data so that the operation unit board 150 can control the timing to input the display image data to the LCD panel 162.

Further, in step S1046, the operation unit control unit 351 of the operation unit board 150 sets the backlight of the LCD panel 162 to On based on expiration of the timer for controlling the backlight to turn on. The microcomputer 151 sets the signal line 159 to 100%, which is a value for setting the backlight of the LCD panel 162 to On. Consequently, the backlight of the LCD panel 162 is turned on, and image display is started. The timer for controlling turning-on of the backlight is provided so that the backlight is turned on at a predetermined timing after the supply of power to the LCD panel 162 is started.

In step S1047, the operation unit control unit 351 of the operation unit board 150 outputs a displayable state notification command to the controller board 110. The displayable state notification command is a command that indicates that the LCD panel 162 has started displaying an image. In step S1048, the UI control unit 303 of the controller board 110 receives the displayable state notification command and transmits a displayable state notification command response. Then, in step S1049, the UI control unit 303 of the controller board 110 sets the state of the operation unit board 150 that is stored on the RAM 112 to the screen display state 212.

By executing the process illustrated in FIG. 5, the information processing apparatus 100 is changed from the screen power-saving state 211 to the screen display state 212. In the present exemplary embodiment, the power source of the LCD panel 162, the bus switch 161, and the backlight of the LCD panel 162 are controlled after the controller board 110 starts transferring the display image data to the operation unit board 150. In this way, the timing to display an image on the LCD panel 162 can be controlled without being affected by the time taken for the controller board 110 to transmit display image data.

Figure 6:
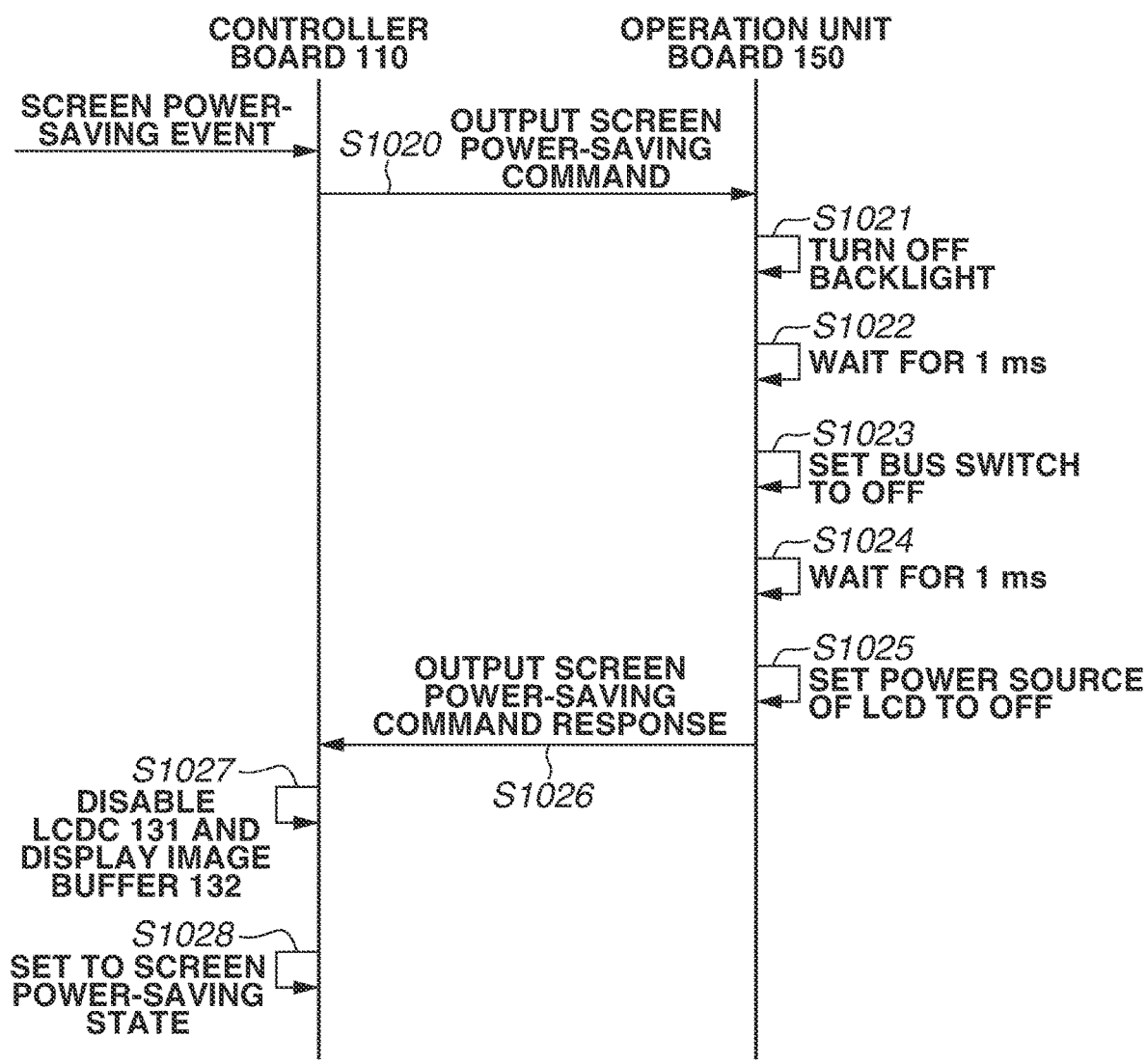
FIG. 6 is a sequence diagram illustrating a sequence of changing the information processing apparatus from the screen display state to the screen power-saving state.

Next, a process that is executed between the controller board 110 and the operation unit board 150 in changing from the screen display state 212 to the screen power-saving state 211 will be described below with reference to FIG. 6. The process illustrated in FIG. 6 is started if a screen power-saving event occurs.

In step S1020, if a screen power-saving event occurs, the UI control unit 303 of the controller board 110 outputs a screen power-saving command to the operation unit board 150. The screen power-saving command is a command for stopping the image display by the LCD panel 162. In step S1021, the operation unit control unit 351 of the operation unit board 150 receives the screen power-saving command and turns off the backlight of the LCD panel 162. In step S1021, the microcomputer 151 controls the signal line 159 to turn off the backlight of the LCD panel 162. In the present exemplary embodiment, the operation unit control unit 351 sets the value of the signal line 159 for controlling the backlight of the LCD panel 162 to 0% to turn off the backlight of the LCD panel 162.

Thereafter, in step S1022, the operation unit control unit 351 of the operation unit board 150 waits for 1 ms using an internal counter. In step S1023, the operation unit control unit 351 of the operation unit board 150 sets the bus switch 161 to Off. The operation unit control unit 351 sets the value of the signal line 166 to "H" (High), which is a value corresponds to Off. Consequently, the input of the display image data supplied from the controller board 110 to the LCD panel 162 is stopped.

In step S1024, the operation unit control unit 351 of the operation unit board 150 sets the bus switch 161 to Off and then waits for 1 ms using the internal timer. Then, in step S1025, the operation unit control unit 351 sets the power source of the LCD panel 162 to Off. In step S1025, the operation unit control unit 351 sets the value of the signal line 158 to "H" (High), which is a value corresponding to Off. Consequently, the supply of power to the LCD panel 162 is stopped.

Then, in step S1026, the operation unit control unit 351 of the operation unit board 150 transmits a screen power-saving command response to the controller board 110. In step S1027, upon receipt of a screen power-saving response command, the UI control unit 303 of the controller board 110 disables the LCDC 131 and the display image buffer 132. Consequently, the output of the display image data to the operation unit board 150 by the controller board 110 is stopped. Lastly, in step S1028, the UI control unit 303 sets the state of the operation unit board 150 that is stored on the RAM 112 to the screen power-saving state 211.

Figure 7:
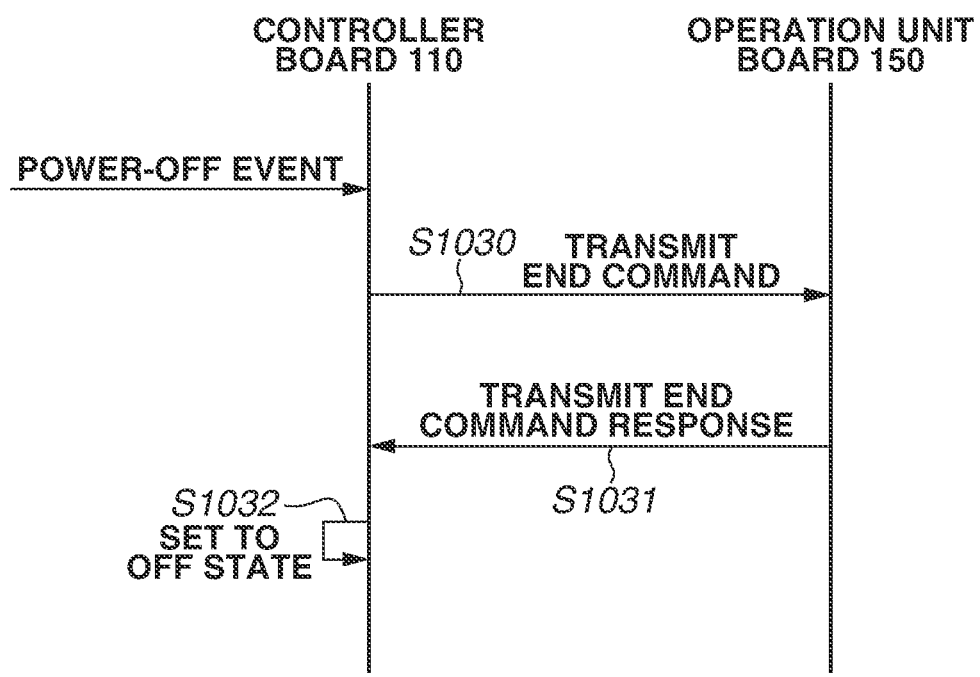
FIG. 7 is a sequence diagram illustrating processing of changing the information processing apparatus from the screen power-saving state to the off state.

Next, a process that is executed between the controller board 110 and the operation unit board 150 in changing from the screen power-saving state 211 to the off state 201 will be described below with reference to FIG. 7. The process illustrated in FIG. 7 is executed if a power-off event occurs. FIG. 7 is a sequence diagram illustrating processing of changing from the screen power-saving state 211 to the off state 201.

In step S1030, the UI control unit 303 of the controller board 110 receives a power-off event and notifies the operation unit board 150 of an end command. In step S1031, the operation unit board 150 transmits a response to the end command to the controller board 110. In step S1032, the controller board 110 sets the state of the information processing apparatus 100 that is stored on the RAM 112 to the off state 201 based on the response command. Consequently, the information processing apparatus 100 enters the off state 201, and the power source of the information processing apparatus 100 is turned off.

Figure 8:
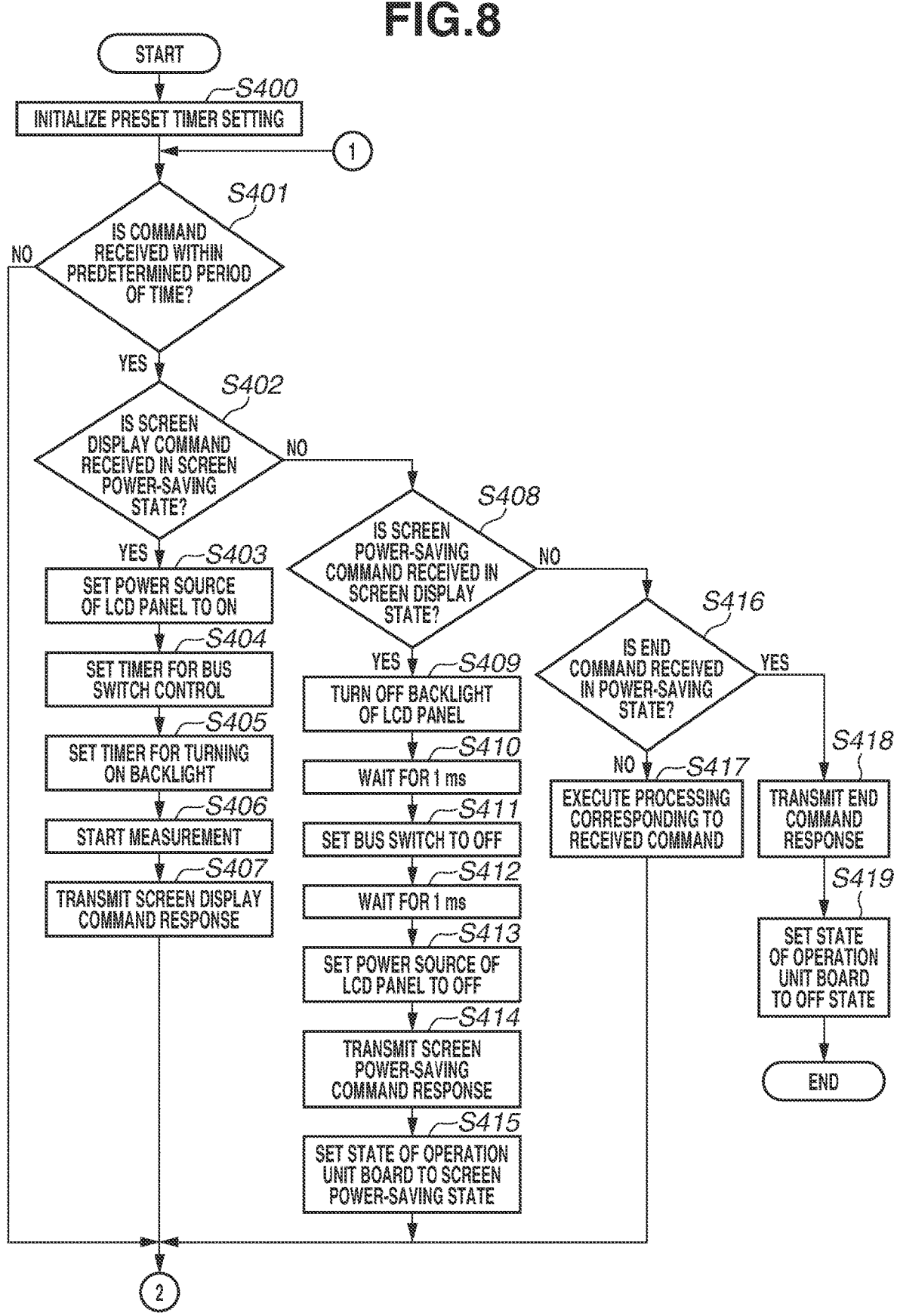
FIG. 8 is a flowchart illustrating a process that is performed by an operation unit control unit of an operation unit board according to the exemplary embodiment of the present disclosure.

Next, details of a process for switching the LCD panel 162 between display and non-display by the operation unit board 150 will be described below with reference to FIG. 8. The flowchart illustrated in FIG. 8 is started if the state of the operation unit board 150 is changed to the screen power-saving state 211 in the sequence illustrated in FIG. 4. A program for executing the process illustrated in the flowchart is stored on a memory in the microcomputer 151, and the microcomputer 151 executes the program to realize the process.

In step S400, the operation unit control unit 351 initializes a setting of a preset timer. The operation unit control unit 351 sets the values of the timer for controlling the bus switch 161 and the timer for turning on the backlight as specified in a timer control table in Table 1. The timer control table is stored on the memory of the microcomputer 151. In the present exemplary embodiment, the preset timer is unset at the time when the power source of the information processing apparatus 100 is turned on, so that the remaining time of each timer is set "Unlimited".

TABLE 1

| Type | Remaining Time |
| --- | --- |
| Timer for Bus Switch Control | <Unlimited> |
| Timer for Turning On Backlight | <Unlimited> |

In step S401, the operation unit control unit 351 determines whether a control command is received within a predetermined period of time. In a case where a control command is not received within the predetermined period of time (NO in step S401), the processing proceeds to a flowchart illustrated in FIG. 9. On the other hand, in a case where a control command is received within the predetermined period of time (YES in step S401), the processing proceeds to step S402. In step S402, the operation unit control unit 351 determines whether a screen display command is received in the screen power-saving state 211. In a case where the received control command is a screen display command, the operation unit control unit 351 refers to the memory of the microcomputer 151 and determines whether the state of the operation unit board 150 at the time when the control command is received is the screen power-saving state 211.

In a case where the state of the operation unit board 150 is the screen power-saving state 211 and a screen display command is received (YES in step S402), the operation unit control unit 351 executes the below-described process.

In step S403, the operation unit control unit 351 controls the signal line (/LCD_PON) 158 for controlling the power source of the LCD panel 162 and starts supplying power to the LCD panel 162.

In step S404, the operation unit control unit 351 sets the time of the timer for controlling the bus switch 161. In the present exemplary embodiment, the timer is set so that the signal line (/LVDS_BUF_CON) 166 is changed from High to Low after 40 ms and image data is input to the LCD panel 162.

Then, in step S405, the operation unit control unit 351 sets the time of the timer for controlling the backlight. In the present exemplary embodiment, the timer is set so that the signal line (LCD_PWM) 159 is controlled after 300 ms and the backlight of the LCD panel 162 is turned on. Table 2 is a timer management table at the time when the processes in steps S404 and S405 are finished. In Table 2, the timer for bus switch control is set to 40 ms later, and the timer for turning on the backlight is set to 300 ms later.

TABLE 2

| Type | Remaining Time |
| --- | --- |
| Timer for Bus Switch Control | 40 ms |
| Timer for Turning On Backlight | 300 ms |

In step S406, the operation unit control unit 351 starts time measurement using the timers set in steps S404 and S405. In the present exemplary embodiment, the time measurement is performed using a timer counter (Tick counter) held on the memory of the microcomputer 151. The timer counter counts up every 1 ms. In step S406, the operation unit control unit 351 stores the value of the timer counter at the time of the start of the measurement on the memory of the microcomputer 151.

Thereafter, in step S407, the operation unit control unit 351 transmits a screen display command response to the UI control unit 303. Thereafter, the operation unit control unit 351 starts a process illustrated in FIG. 9.

Figure 9:
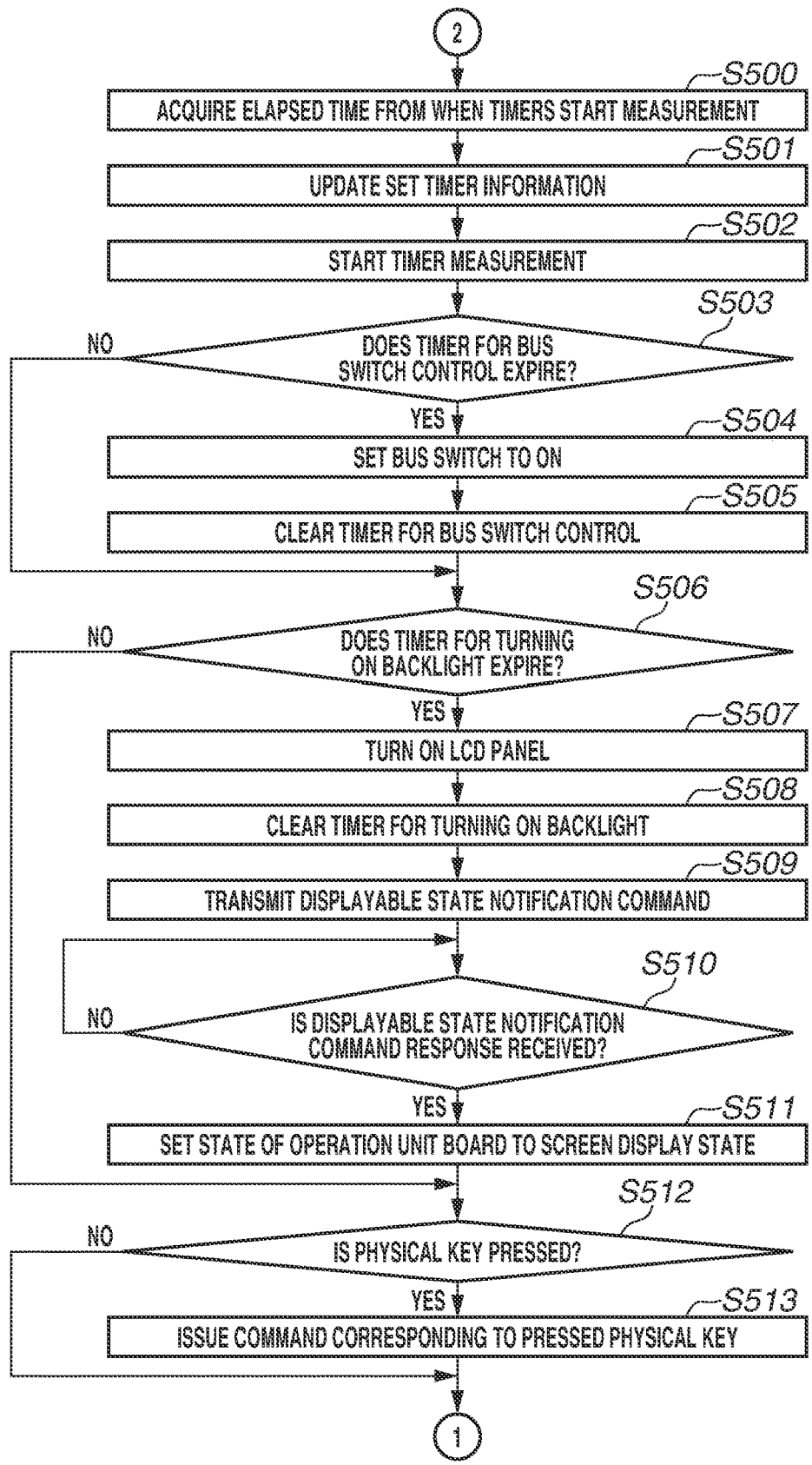
FIG. 9 is a flowchart illustrating a process that is performed by the operation unit control unit of the operation unit board and relates to control of a bus switch and a backlight of a liquid crystal display (LCD) panel according to the exemplary embodiment of the present disclosure.

The process that is executed regardless of the type of the received control command will be described below with reference to FIG. 9.

In step S500, the operation unit control unit 351 acquires an elapsed time after the timers start measurement. In step S500, the operation unit control unit 351 acquires the current value of the timer counter. The elapsed time is calculated from the difference between the acquired current value of the timer counter and the value of the timer counter at the time of the start of the measurement that is stored on the memory of the microcomputer 151.

In step S501, the operation unit control unit 351 updates the timers based on the acquired elapsed time. For example, in a case where the elapsed time acquired in step S500 is 40 ms, the operation unit control unit 351 subtracts the elapsed time from the time of each timer that is stored on the timer management table and updates the timer management table. Table 3 is an updated timer management table. In a case where the elapsed time is longer than the time managed in the timer management table, the operation unit control unit 351 sets the remaining time to 0 ms.

TABLE 3

| Type | Remaining Time |
|---|---|
| Timer for Bus Switch Control | 0 ms |
| Timer for Turning On Backlight | 260 ms |

In step S502, the operation unit control unit 351 restarts the measurement using the timers. In step S502, the operation unit control unit 351 acquires the value of the timer counter and updates the value of the timer counter at the time of the start of the measurement that is stored on the microcomputer 151 with the acquired value. By executing the above-described process, the measurement by the timers is restarted.

In step S503, the operation unit control unit 351 determines whether the timer for bus switch control expires. The operation unit control unit 351 refers to the remaining time of the timer for bus switch control in the timer management table and determines whether the timer expires. In Table 3, the remaining time of the timer for bus switch control is 0 ms, so that the operation unit control unit 351 determines that the timer for bus switch control expires. In a case where the operation unit control unit 351 determines that the timer for bus switch control does not expire (NO in step S503), the processing proceeds to step S506.

On the other hand, in a case where the operation unit control unit 351 determines that the timer for bus switch control expires (YES in step S503), the processing proceeds to step S504. In step S504, the operation unit control unit 351 sets the signal line (/LVDS_BUF_CON) 166 for controlling the bus switch 161 to On. By executing the process in step S504, the display image data transmitted from the controller board 110 is input to the LCD panel 162.

In step S505, the operation unit control unit 351 clears the timer for bus switch control. In the present exemplary embodiment, the operation unit control unit 351 clears the timer by setting the remaining time in the timer management table to "Unlimited". By executing the process in step S505, the timer management table as specified in Table 4 is obtained.

TABLE 4

| Type | Remaining Time |
|---|---|
| Timer for Bus Switch Control | <Unlimited> |
| Timer for Turning On Backlight | 260 ms |

Next, in step S506, the operation unit control unit 351 determines whether the timer for turning on the backlight expires. The operation unit control unit 351 refers to the remaining time of the timer for turning on the backlight in the timer management table and determines whether the timer expires. The determination is performed using a similar method to that used for the timer for bus switch control. In a case where the timer for turning on the backlight does not expire (NO in step S506), the processing proceeds to step S512.

On the other hand, in a case where the timer for turning on the backlight expires (YES in step S506), the processing proceeds to step S507. In step S507, the operation unit control unit 351 controls the signal line (LCD_PWM) 159 for backlight control and turns on the backlight of the LCD panel 162. In the present exemplary embodiment, a backlight turn-on level is described in two patterns, 0% and 100%. Alternatively, the backlight turn-on level can be divided into a plurality of stages. Alternatively, the backlight of the LCD panel 162 can be turned on according to brightness set by the user via hardware, such as a dial key, or the touch panel 163 of the operation unit board 150. Thereafter, in step S508, the operation unit control unit 351 clears the timer for turning on the backlight. In the present exemplary embodiment, the operation unit control unit 351 sets the value of the timer for turning on the backlight in the timer management table to "Unlimited".

In step S509, the operation unit control unit 351 transmits a displayable state notification command to the UI control unit 303. Then, in step S510, the operation unit control unit 351 determines whether a displayable state notification command response is received from the UI control unit 303. In step S510, the processing does not proceed and the operation unit control unit 351 waits until a displayable state notification command response is received from the UI control unit 303. If the operation unit control unit 351 receives a displayable state notification command response from the UI control unit 303 (YES in step S510), the processing proceeds to step S511. In step S511, the operation unit control unit 351 sets the state of the operation unit board 150 on the memory of the microcomputer 151 to the screen display state 212. The displayable state notification command is transmitted in step S509 so that the operation unit control unit 351 notifies the UI control unit 303 that image display is started.

Next, in step S512, the operation unit control unit 351 determines whether a user operation is performed. Specifically, the operation unit control unit 351 determines that a user operation is performed in a case where a press of the physical key 155 or a touch on the touch panel 163 is detected. In a case where the operation unit control unit 351 determines that no user operation is performed (NO in step S512), the process illustrated in FIG. 9 is ended.

On the other hand, in a case where the operation unit control unit 351 determines that a user operation is performed (YES in step S512), the processing proceeds to step S513. In step S513, the operation unit control unit 351 transmits a command corresponding to the user operation to the UI control unit 303. For example, the operation unit control unit 351 transmits information that specifies which physical key is pressed or coordinate information about the touch operation to the UI control unit 303. Then, the operation unit control unit 351 receives a command response corresponding to the operation from the UI control unit 303.

Returning to the description of the flowchart in FIG. 8, in a case where a screen display command is not received in the screen power-saving state (NO in step S402), the processing proceeds to step S408. In step S408, the operation unit control unit 351 determines whether a screen power-saving command is received in the screen display state 212. The operation unit control unit 351 determines whether the received control command is a screen power-saving command. In a case where the received command is a screen power-saving command, the operation unit control unit 351 refers to the memory of the microcomputer 151 and determines whether the state of the operation unit board 150 is the screen display state 212. In a case where the operation unit control unit 351 determines that a screen power-saving command is received in the screen display state 212 based on the two determination results (YES in step S408), the operation unit control unit 351 executes the processes in steps S409 to S415.

In step S409, the operation unit control unit 351 controls the signal line (LCD_PWM) 159 for controlling the backlight and turns off the backlight of the LCD panel 162. In step S410, the operation unit control unit 351 sets the timer to 1 ms and waits for 1 ms.

In step S411, the operation unit control unit 351 receives a timer interruption signal and sets the signal line (/LVDS_BUF_CON) 166 for bus switch control to High and sets the bus switch 161 to Off. Consequently, the display image data transmitted from the controller board 110 to the operation unit board 150 via a display image data signal line LVDS_DATA(LCD) 165 is not input to the LCD panel 162.

In step S412, the operation unit control unit 351 sets the timer to 1 ms and waits for 1 ms. In step S413, based on an interruption due to timer expiration, the operation unit control unit 351 sets the signal line (/LCD_PON) 158 for controlling the power source of the LCD panel 162 to High and stops the supply of power to the LCD panel 162.

In step S414, the operation unit control unit 351 transmits a screen power-saving command response to the UI control unit 303.

In step S415, the operation unit control unit 351 sets the screen power-saving state 211 as the state of the operation unit board 150 in the memory of the microcomputer 151.

In a case where the operation unit control unit 351 determines that a screen power-saving command is not received in the screen display state 212 (NO in step S408), the processing proceeds to step S416. In step S416, the operation unit control unit 351 determines whether an end command is received in the power-saving state. The operation unit control unit 351 determines whether the received control command is an end command. In a case where the received control command is an end command, the operation unit control unit 351 refers to the memory of the microcomputer 151 and determines whether the state of the operation unit board 150 is the power-saving state. Based on the two determination results, the operation unit control unit 351 determines whether the end command is received in the power-saving state.

In a case where an end command is not received in the power-saving state (NO in step S416), the processing proceeds to step S417. In step S417, the operation unit control unit 351 executes processing corresponding to the received control command. For example, in a case where the received control command is a LED control command, the operation unit control unit 351 controls the LED 157 to be turned on or off. In a case where the received control command is a buzzer control command, the operation unit control unit 351 controls the buzzer 156. Further, in a case where the combination of the received control command and the state of the operation unit board 150 is none of those in steps S402, S408, and S416, the operation unit control unit 351 transmits an error command to the UI control unit 303.

In a case where the state of the operation unit board 150 is the power-saving state and an end command is received (YES in step S416), the processing proceeds to step S418. In step S418, the operation unit control unit 351 transmits an end command response to the UI control unit 303. In step S419, the operation unit control unit 351 sets the state of the operation unit board 150 to the off state 201. Only in the cases where this condition is satisfied, the operation unit control unit 351 ends the process and stops without receiving a new control command hereafter.

In the present exemplary embodiment, a user operation can be received during time measurement by the timer for bus switch control and the timer for turning on the backlight, and control corresponding to the user operation is executed. In a case where the time to be counted is relatively short, e.g., a case where the backlight is turned off or the bus switch 161 is turned off, the processing is executed in such a manner that interruption due to a user operation does not occur. As to the timer for bus switch control and the timer for turning on the backlight, interruption processing due to a user operation may not be executed.

Figure 10:
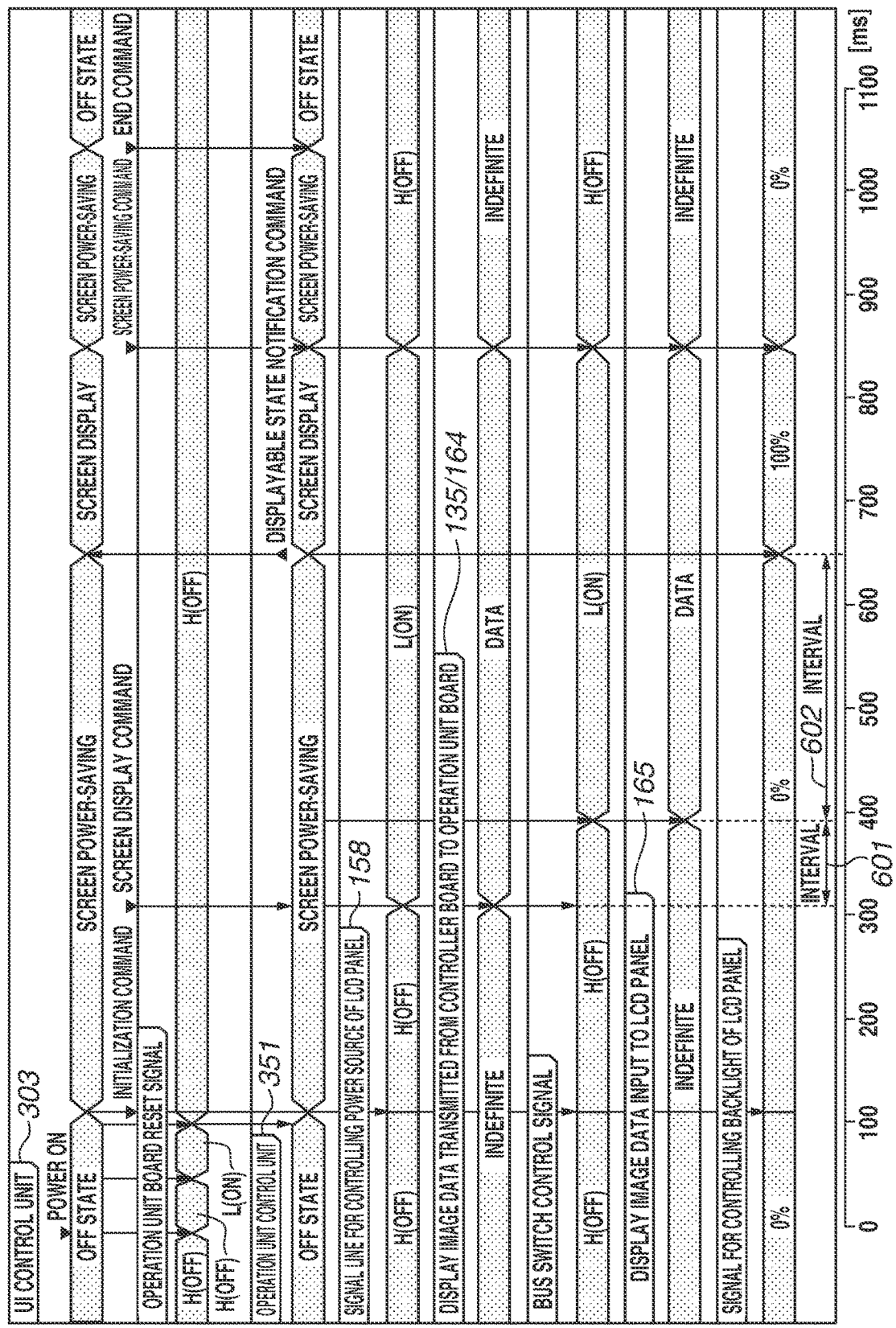
FIG. 10 is a timing chart illustrating a state of a controller board and a state of the operation unit board according to the exemplary embodiment of the present disclosure.

FIG. 10 is a timing chart illustrating outputs of the signal lines in the present exemplary embodiment.

As apparent from the timing chart, input of display image data from the controller board 110 to the operation unit board 150 is started before the bus switch control signal line is turned on. Then, if the bus switch control signal line is turned on, input of display image data to the LCD panel 162 is started. Specifically, during an interval 601, the display image data is transmitted from the controller board 110 to the operation unit board 150, but the display image data is not input to the LCD panel 162. This allows a display image to be supplied to the LCD panel 162 immediately after the operation unit control unit 351 switches the bus switch 161. During an interval 602, the display image data is input to the LCD panel 162, but the LCD panel 162 does not display an image because of the backlight is not turned on. If the operation unit control unit 351 switches the backlight control signal, image display is immediately started.

As described above, in the present exemplary embodiment, input of a display image to the LCD panel 162 and turning on of the backlight are controlled regardless of whether the CPU 111 is performing processing related to any of the control units or applications. This can prevent the intervals 601 and 602 from being longer than an expected length of time, so that timing control is precisely performed.

Further, in the present exemplary embodiment, if the LCD panel 162 starts image display, a displayable state notification command is transmitted to the UI control unit 303. This allows the controller board 110 to determine whether the LCD panel 162 is performing image display even in a case where the operation unit board 150 controls input of a display image to the LCD panel 162 and the backlight.

OTHER EXEMPLARY EMBODIMENT

In the above-described exemplary embodiment, the controller board 110 and the operation unit board 150 are described as separate boards. The functions of the two boards can be realized by a single board. Further, in the above-described exemplary embodiment, the microcomputer 151 of the operation unit board 150 controls the bus switch 161 and the backlight of the LCD panel 162. Alternatively, the CPU 111 of the controller board 110 can control the bus switch 161 and the backlight of the LCD panel 162. In this case, after the CPU 111 enables the LCDC 131, the CPU 111 waits for a predefined amount of time and then transmits a command to turn on the bus switch 161. After the CPU 111 turns on the bus switch 161, the CPU 111 waits for another predefined amount of time and then transmits a command to control the backlight of the LCD panel 162.

In the above-described exemplary embodiment, switching regarding whether image data transmitted from the LCDC 131 is to be input to the LCD is made using the bus switch 161. Any configuration that can control image data transmitted from the LCDC 131 not to be input to the LCD may be employed in place of the bus switch 161. For example, a buffer can be attached to the position of the bus switch 161 in place of the bus switch 161. The microcomputer 151 performs control so that display image data is not input from the buffer to the LCD at the time of changing from the off state 201 to the screen power-saving state 211. Thereafter, the CPU 111 enables the LCDC 131, and transmission of the display image data stored on the display image buffer 132 to the operation unit board 150 is started. At this timing, input of display image data to the buffer is started, but the display image data input to the buffer is not input to the LCD panel 162. After the transmission of the display image data to the buffer is started, the microcomputer 151 performs control so that the display image data input to the buffer is transmitted to the LCD panel 162. Consequently, the display image data stored on the buffer is input to the LCD panel 162.

The present disclosure also can be realized by executing the below-described process. Specifically, software (program) that realizes the functions of the above-described exemplary embodiment is supplied to a system or apparatus via a network or various storage media, and a computer (or a CPU or a micro-processing unit (MPU)) of the system or apparatus reads a program code and executes the read program code. The computer program and the storage medium that stores the computer program are encompassed within the scope of the invention.

The information processing apparatus according to the present exemplary embodiment inputs display image data to a display unit based on a start of supply of power to the display unit.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-016308, filed Jan. 31, 2019, which is hereby incorporated by reference herein in its entirety.

What is claimed is:

1. An information processing apparatus comprising:
   a display configured to display based on display image data;
   a memory configured to store the display image data;
   a display controller configured to output the stored display image data to the display; and
   a controller configured to perform control so as to start a power supply to the display before the display image data display image data output by the display controller is input to the display, and then the controller performs control so as to input the display image data output by the display controller to the display.

2. The information processing apparatus according to claim 1, wherein the controller issues a first command based on a start of output of the display image data,
   wherein the first command is a command for supplying power to the display.

3. The information processing apparatus according to claim 2,
   wherein the display is a liquid crystal panel,
   wherein the information processing apparatus further comprises a backlight controller configured to control a backlight of the display, and
   wherein the backlight controller turns on the backlight of the display based on a start of input of the display image data to the display.

4. The information processing apparatus according to claim 3, wherein the backlight controller controls the backlight of the display to be turned on based on an elapsed time after the controller performs control so as to input the display image data output by the display controller to the display.

5. The information processing apparatus according to claim 4,
   wherein the controller issues a second command to change from a state where the display displays a screen to a state where the display does not display the screen, and
   wherein the backlight controller turns off the backlight of the display based on the second command issued by the controller.

6. The information processing apparatus according to claim 5, wherein the controller performs control so as not to input the display image data output by the display controller to the display after the backlight turns off.

7. The information processing apparatus according to claim 6, wherein the power supply to the display is stopped after the controller performs control so as not to input the display image data output by the display controller.

8. The information processing apparatus according to claim 7, wherein the display controller stops outputting the display image data based on the stop of the power supply to the display.

9. The information processing apparatus according to claim 1, wherein the display controller performs control so as to start outputting the display image data in a situation that the display image data to be output by the display controller is not inputted to the display.

10. The information processing apparatus according to claim 1, further comprising a switch,
    wherein the controller performs control so as not to input the display image data to be output by the display controller before the display controller outputs the display image data.

11. The information processing apparatus according to claim 1, further comprising an image forming circuit configured to form an image on a sheet.

12. The information processing apparatus according to claim 10,
    wherein the controller performs control so as to input the display image data output by the display controller to the display after the controller performs control so as to start the power supply to the display.

13. The information processing apparatus according to claim 1, wherein the controller performs control so as to input the display image data output by the display controller to the display within a predetermined period after the controller performs control to start the power supply to the display.

14. The information processing apparatus according to claim 1, wherein the display controller keeps transmitting the display image data after the controller performs control so as to input the display image data output by the display controller to the display.

15. A method of controlling an information processing apparatus, the method comprising:
   storing display image data;
   outputting the stored display image data to a display; and
   performing control so as to start a power supply to the display before the display image data is input to the display and then performing control so as to input the display image data to the display.

16. A non-transitory storage medium that stores a program of controlling an information processing apparatus using a method, the method comprising:
   storing display image data;
   outputting the stored display image data to a display; and
   performing control so as to start a power supply to the display before the display image data is input to the display and then performing control so as to input the display image data to the display.

* * * * *